US008875221B2

(12) United States Patent
Nakae

(10) Patent No.: US 8,875,221 B2
(45) Date of Patent: Oct. 28, 2014

(54) POLICY MANAGEMENT APPARATUS, POLICY MANAGEMENT SYSTEM, AND METHOD AND PROGRAM USED FOR THE SAME

(75) Inventor: Masayuki Nakae, Tokyo (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 13/144,829

(22) PCT Filed: Jan. 26, 2010

(86) PCT No.: PCT/JP2010/000414
§ 371 (c)(1),
(2), (4) Date: Jul. 15, 2011

(87) PCT Pub. No.: WO2010/092755
PCT Pub. Date: Aug. 19, 2010

(65) Prior Publication Data
US 2011/0289550 A1 Nov. 24, 2011

(30) Foreign Application Priority Data

Feb. 10, 2009 (JP) ................................. 2009-028985

(51) Int. Cl.
*G06F 17/00* (2006.01)
*G06F 21/60* (2013.01)

(52) U.S. Cl.
CPC .................................... *G06F 21/604* (2013.01)
USPC ........................................................... 726/1

(58) Field of Classification Search
USPC ....................... 726/1–7, 14, 16–17, 21, 26–30
See application file for complete search history.

(56) References Cited

U.S. PATENT DOCUMENTS

| 2004/0039594 A1* | 2/2004 | Narasimhan et al. ............. 705/1 |
| 2006/0072456 A1* | 4/2006 | Chari et al. .................... 370/230 |
| 2007/0056019 A1* | 3/2007 | Allen et al. ........................ 726/1 |
| 2009/0063665 A1* | 3/2009 | Bagepalli et al. ............. 709/222 |

(Continued)

FOREIGN PATENT DOCUMENTS

| JP | 2004280727 A | 10/2004 |
| JP | 2006155104 A | 6/2006 |
| JP | 2007249617 A | 9/2007 |
| WO | 0214989 A1 | 2/2002 |

OTHER PUBLICATIONS

International Search Report for PCT/JP2010/000414 mailed Mar. 2, 2010.
H. Nagase et al., "Access Right Assignment Method which Based on Margin of Hierarchical Security Level", Transactions of Information Processing Society of Japan, vol. 41, No. 8, Aug. 15, 2000, pp. 2255-2263.
European search report for EP 10741035.9 dated Dec. 10, 2012.
EPO Form 1224 for EP 10741035.9 dated Jan. 2, 2012.
Agrawal D et al: "Policy Ratification", Policies for Distributed Systems and Networks, 2005. Sixth IEEE International Workshop on Stockholm, Sweden Jun. 6-8, 2005, Piscataway, NJ, USA, IEEE, Jun. 6, 2005, pp. 223-232, XP01.

*Primary Examiner* — Jeffrey Pwu
*Assistant Examiner* — Carlos Amorin
(74) *Attorney, Agent, or Firm* — Sughrue Mion, PLLC

(57) ABSTRACT

There are provided a role information storing unit (11) that stores role information including information indicative of subject sets, and information capable of specifying inclusion relationships between subject sets, a policy description storing unit (12) that stores policy descriptions including information indicative of policies and information for identifying subject sets to which the policies are to be applied, a policy stratifying unit (13) that generates a policy hierarchy in which two or more policies are stratified based on inclusion relationships between subject sets to which each policy is applied, and a policy ordering unit (14) that totally orders policy sets made of the two or more policies to be totally ordered based on information indicative of the policy hierarchy while maintaining a higher/lower relationship in a hierarchy.

14 Claims, 20 Drawing Sheets

(56) References Cited

U.S. PATENT DOCUMENTS

| | | | |
|---|---|---|---|
| 2009/0178102 A1* | 7/2009 | Alghathbar et al. | 726/1 |
| 2009/0300711 A1* | 12/2009 | Tokutani et al. | 726/1 |
| 2010/0299717 A1* | 11/2010 | Nasirifard et al. | 726/1 |
| 2010/0306268 A1* | 12/2010 | Bhatti et al. | 707/783 |
| 2011/0083159 A1* | 4/2011 | Brown et al. | 726/1 |

* cited by examiner

FIG. 8

```
<Policy Policyif = "4">
 <Target>
  <Subjects>
   <Subject>
    <SubjectMatch MetchId="string-match">
     <SubjectAttributeDesingeator AttributeId="role-id" .../>
      <AttributeValue> General Affairs Department</AttributeValue>
    </SubjectMatch>
   </Subject>
  </Subjects>
  <Resources><AnyResources/></Resources>
  <Actions><AnyActions/></Actions>
 </Target>
 <Rule RuleID="rule-1" effect="deny">
  <Target>
   <Subjects><AnySubjects></Subjects>
   <Resources>
    <ResourceMatch MatchId="string-match">
     <ResourceAtributeDesignator AttributeId="resource-id" />
     <AttributeValue>http://soumu-web/</AttributeValue>
    </ResourceMatch>
   </Resources>
   <Actions>
    <Action>read</Action>
    <Action>write</Action>
   </Actions>
  </Target>
 </Rule>
</Policy>
```

FIG. 12

| POLICY ID | POLICY NAME | MANAGER ID | VERSION | UPDATE TIME | ROLE ID | ACL-GENERATED FLAG | POLICY DESCRIPTION DATA |
|---|---|---|---|---|---|---|---|
| | | | | | | | |

FIG. 16

| POLICY ID | POLICY NAME | MANAGER ID | VERSION | UPDATE TIME | ROLE ID | POLICY DESCRIPTION DATA |
|---|---|---|---|---|---|---|
| | | | | | | |

POLICY MANAGEMENT APPARATUS, POLICY MANAGEMENT SYSTEM, AND METHOD AND PROGRAM USED FOR THE SAME

The present application is the National Phase of PCT/JP2010/000414, filed Jan. 26, 2010, which claims the priority based on Japanese Patent Laid-Open No. 2009-028985 filed on 10 Feb. 2009 and all of its disclosure is incorporated herein.

TECHNICAL FIELD

The present invention relates to a policy management apparatus, a policy management system, and a method and program used for the same, and particularly to a policy management apparatus, a policy management system, and a method and program used for the same capable of totally ordering policy descriptions having a partially-ordered structure to generate a list of policies or to convert them into an access control rule.

BACKGROUND ART

Along with a growing sense of compliance in recent years, many companies provide thorough access control in their own work systems. As seen in an OS access mechanism such as Unix (trademark) file system, a typical access control rule is described in combination of three items of information including "subject" such as employees using a work system, "object" such as files provided by the work system, and "action" such as read/write which is a method for accessing the object, and is applied to an access control mechanism.

There is a problem that as the numbers of employees and work files increase, a load on a manger for describing and managing the access control rule increases. A role-based access control system (RBAC) is well known as one of the solutions for the above problem. The RBAC access control rule describes sets made of "roles" of the employees such as departments and responsibilities, and object/action as the permitted right to access the roles.

Since an increase in rules can be prevented further by describing the rules in units of role than by describing the rules in units of subject, the load on the manager is reduced. In order to avoid disturbances, the access control rule made of the combination of "subject", "object" and "action" is called ACL (Access Control List) and the RBAC access control rule is called RBAC policy or simply policy.

In order to apply the set of RBAC policies to the access mechanism, the set of policies needs to be converted into a single ACL description. Since positive policies, that is, only "permitted rights to access" for predetermined roles are described in a conventional RBAC system, the RBAC policies can be converted into a single ACL by simply calculating direct products S×OA of the subject set S having a role associated with each policy and the set OA of object/action and linking them in an arbitrary description order.

However, in the work of the policy management, negative policies, that is, "prohibited rights to access" for predetermined roles may be wanted to be described together.

For example, it may be desired to describe a positive policy for a larger subject set such as "persons in accounting department may access accounting files on the common server (policy 1)" and additionally a negative policy for a smaller subject set such as "persons doubling as another department cannot access accounting files (policy 2)" as an exceptional policy.

The conversion into a single ACL is merely to identify the combination of subject, object and action to be permitted or denied from among the policy set concurrently including the positive policies and the negative policies. Patent Document 1 describes a method for stratifying the policy sets and deciding a combination of subject, object and action to be permitted or denied based on the hierarchy structure.

RELATED DOCUMENT

Patent Document

[Patent Document 1] Japanese Patent Application Laid-Open No. 2006-155104 (paragraph 0071)

DISCLOSURE OF THE INVENTION

In order to correctly convert a policy set concurrently including positive policies and negative policies into a single ACL, an ACL description order needs to be decided for each element in the policy set according to inclusion relationships between subject sets.

For example, in order to convert the policy set into a single ACL, a principle/exception relationship between policies cannot be correctly reflected if the ACL description derived from the policy 1 is not linked after the ACL description derived from the policy 2. If the ACL description derived from the policy 1 is linked ahead, the access control mechanism permits the persons doubling as accounting department to access the accounting files according to the ACL description derived from the policy 1.

The terms used for the present invention will be defined as follows.

[Definition of Policy Inclusion Relationship]

It is assumed that there are two policies p1 and p2 and subject sets corresponding thereto are S1 and S2, respectively. When $S1 \subseteq S2$ and only in this case, it is defined that p1 includes p2. The inclusion relationship is written as p1<p2.

[Definition of Total Order of Policy Sets]

When a policy set P={p1, p2, . . . , pN} is given, a series σ of elements in P meeting the following nature is called total order.

(Nature): "if pi<pj is met for elements pi and pj in an arbitrary P, pi surely appears before pj in σ."

The correct description order of the single ACL corresponds to the total order of the above-defined policy set. In order words, assuming that the ACL descriptions corresponding to the policies pi and pj meeting pi<pj are A(pi) and A(pj), respectively, the single ACL is obtained by linking the ACL descriptions in the order of A(pi|A(pj)).

For example, it is assumed that for an arbitrary P={p1, p2, p3, p4, p5}, the subject sets S1, S2, S3, S4, S5 corresponding to the respective policies have inclusion relationships shown in FIG. 18. The policy inclusion relationships contained in P are p1>p2, p1>p3, p1>p4, p1>p5, p2>p4, p2>p5, p3>p4, and the total order a meeting the orders (partial orders) is <p1, p2, p3, p4, p5> or <p1, p2, p3, p5, p4>.

However, there is not disclosed for the RBAC policy management system a specific method for finding the total order of policy sets based on the inclusion relationships between the subject sets corresponding to the policies, and thus the ACL description order for the policy set including positive policies and negative policies cannot be presented to the policy manager or cannot be correctly converted into a single ACL.

For example, for the method described in Patent Document 1, there is described that whether access control settings under which target resources are overlapping are contradictory is analyzed based on the hierarchy (control path) of the object sets, and when a contradiction is detected, any of the contradictory access control settings is corrected according to a given contradiction addressing rule (whether an access effect value is equal to or more than a predetermined access effect value).

However, the method described in Patent Document 1 does not take into consideration the fact that a principle/exception relationship occurs among the policies depending on the inclusion relationships between the subject sets. For example, if a contradiction is detected due to a previously-registered exception, even when a contradiction does not occur in a correct application order, the policy set by the policy manager may be detected as breach.

It is therefore an object of the present invention to provide a policy management system, a policy management method and a policy management program capable of correctly converting a policy set concurrently including positive policies and negative policies into a single access control rule.

A policy management apparatus according to the present invention comprises a role information storing unit that stores role information including information indicative of subject sets to which policies are to be applied, and information capable of specifying inclusion relationships between subject sets contained in the role information, a policy description storing unit that stores policy descriptions including information indicative of policies and information for identifying subject sets to which the policies are to be applied, a policy stratifying unit that, for two or more policies stored in the policy description storing unit, generates a policy hierarchy in which two or more policies are stratified based on inclusion relationships between subject sets to which each policy is applied by assuming that each policy is a node, and a policy ordering unit that totally orders policy sets made of the two or more policies to be totally ordered based on information indicating a policy hierarchy generated by the policy stratifying unit while maintaining a higher/lower relationship in a hierarchy.

A policy management system according to the present invention comprises a role storing device comprising a role information storing unit that stores role information including information indicative of subject sets to which policies are to be applied, and information capable of specifying inclusion relationships between subject sets contained in the role information, a policy description storing device comprising a policy description storing unit that stores policy descriptions including information indicative of policies and information for identifying subject sets to which the policies are to be applied, and a policy totally-ordering device comprising a policy stratifying unit that, for two or more policies stored in the policy description storing unit, generates a policy hierarchy including a layer made of a policy applied to a subject set not in an inclusion relationship based on inclusion relationships between subject sets to which each policy is applied by assuming that each policy is a node, and a policy ordering unit that totally orders policy sets made of the two or more policies to be totally ordered while maintaining a hierarchy relationship between policies in different layers based on information indicative of a policy hierarchy generated by the policy stratifying unit.

A policy ordering method according to the present invention, for given subject sets for which inclusion relationships between subject sets can be specified, and policy sets in which subject sets to be applied are indicated, comprises, for two or more policies contained in the policy sets, a policy stratifying step for generating a policy hierarchy including a layer made of a policy to be applied to a subject set not in an inclusion relationship based on inclusion relationships between subject sets to which each policy is applied by assuming that each policy is a node, and a policy ordering step for totally ordering policy sets made of two or more policies to be totally ordered while maintaining a hierarchy relationship between policies in different layers based on information indicative of a policy hierarchy generated in the policy stratifying step.

A policy list displaying method according to the present invention, for given subject sets for which inclusion relationships between subject sets can be specified, and policy sets in which subject sets to be applied are indicated, comprises, for two or more policies contained in the policy sets, a policy stratifying step for generating a policy hierarchy including a layer made of a policy to be applied to a subject set not in an inclusion relationship based on inclusion relationships between subject sets to which each policy is applied by assuming that each policy is a node, a policy ordering step for totally ordering policy sets made of two or more policies to be totally ordered while maintaining a hierarchy relationship between policies in different layers based on information indicative of a policy hierarchy generated in the policy stratifying step, and a list displaying step for arranging elements in a policy set to be totally ordered according to a policy order decided as a total order in the policy ordering step and listing up the same.

An ACL generating method according to the present invention, for given subject sets for which inclusion relationships between subject sets can be specified, and policy sets in which subject sets to be applied are indicated, comprises, for two or more policies contained in the policy sets, a policy stratifying step for generating a policy hierarchy including a layer made of a policy to be applied to a subject set not in an inclusion relationship based on inclusion relationships between subject sets to which each policy is applied by assuming that each policy is a node, a policy ordering step for totally ordering policy sets made of two or more policies to be totally ordered while maintaining a hierarchy relationship between policies in different layers based on information indicative of a policy hierarchy generated in the policy stratifying step, and an ACL generating step for converting each policy description contained in a policy set to be totally ordered into an ACL description according to a policy order decided as a total order in the policy ordering step.

A non-transitory computer-readable medium according to the present invention on which is stored a policy ordering program, for given subject sets for which inclusion relationships between subject sets can be specified, and policy sets in which subject sets to be applied are indicated, causes a computer to perform policy stratifying processing that, for two or more policies contained in the policy sets, generates a policy hierarchy including a layer made of a policy to be applied to a subject set not in an inclusion relationship based on inclusion relationships between subject sets to which each policy is applied by assuming that each policy is a node, and policy ordering processing that totally orders policy sets made of two or more policies to be totally ordered while maintaining a hierarchy relationship between policies in different layers based on information indicative of a policy hierarchy generated in the policy stratifying processing.

A non-transitory computer-readable medium according to the present invention on which is stored a policy list displaying program, for given subject sets for which inclusion relationships between subject sets can be specified, and policy sets in which subject sets to be applied are indicated, causes a computer to perform policy stratifying processing that, for two or more policies contained in the policy sets, generates a policy hierarchy including a layer made of a policy to be applied to a subject set not in an inclusion relationship based on the inclusion relationships between subject sets to which each policy is applied by assuming that each policy is a node, policy ordering processing that totally orders policy sets made of two or more policies to be totally ordered while maintaining a hierarchy relationship between policies in different layers based on information indicative of a policy hierarchy generated in the policy stratifying processing, and list displaying processing that arranges elements in a policy set to be totally ordered according to a policy order decided as total order in the policy ordering processing and lists up the same.

A non-transitory computer-readable medium according to the present invention on which is stored an ACL generating program, for given subject sets for which inclusion relationship between subject sets can be specified, and policy sets in which subject sets to be applied are indicated, causes a computer to perform policy stratifying processing that, for two or more policies contained in the policy sets, generates a policy hierarchy including a layer made of a policy to be applied to a subject set not in an inclusion relationship based on inclusion relationships between subject sets to which each policy is applied by assuming that each policy is a node, policy ordering processing that totally orders policy sets made of two or more policies to be totally ordered while maintaining a hierarchy relationship between policies in different layers based on information indicative of a policy hierarchy generated in the policy stratifying processing, and ACL generating processing that converts each policy description contained in a policy set to be totally ordered into an ACL description according to a policy order decided as total order in the policy ordering step.

According to the present invention, it is possible to correctly convert a policy set concurrently including positive policies and negative policies into a single access control rule.

BRIEF DESCRIPTION OF THE DRAWINGS

FIG. 8 is an explanatory diagram showing a specific example of policy descriptions stored in a policy DB 102.

FIG. 12 is an explanatory diagram showing an exemplary schema of the policy DB 102 (policy DB schema) according to the second embodiment.

FIG. 16 is an explanatory diagram showing an exemplary schema of the policy DB 102 (policy DB schema) according to the third embodiment.

DESCRIPTION OF EMBODIMENTS

1. First Embodiment
1.1. Structure

Figure 1:
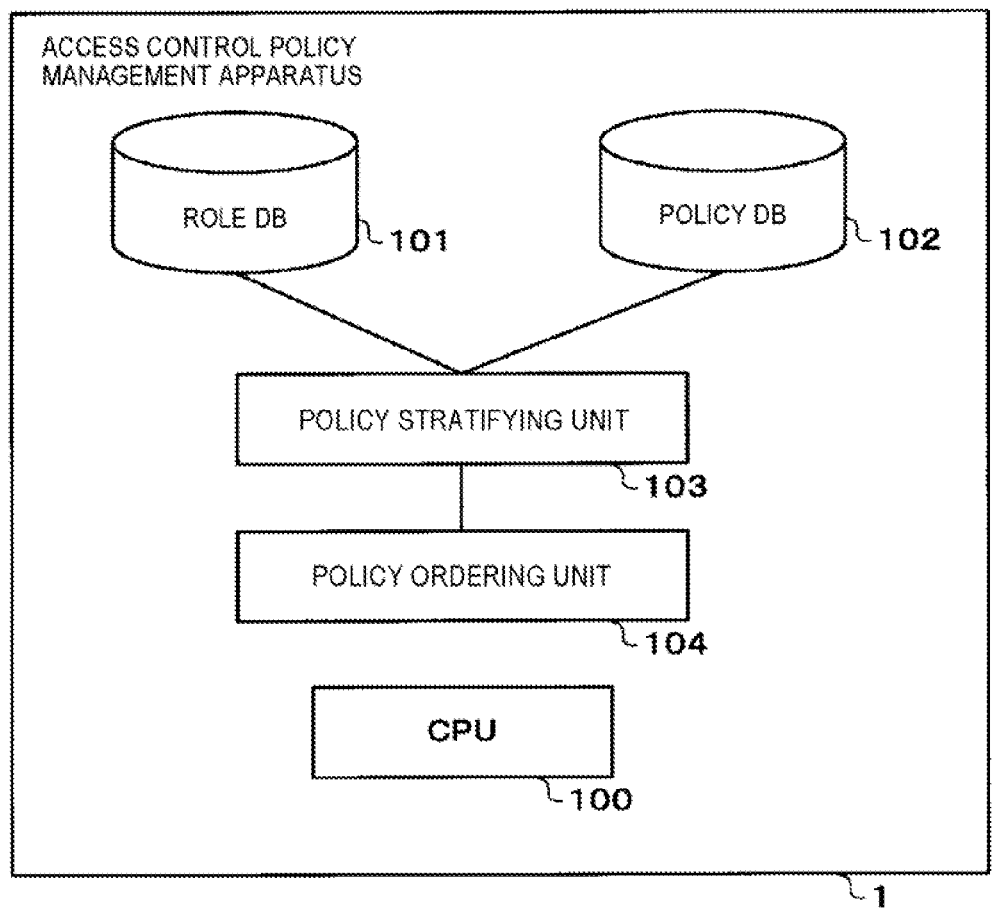
FIG. 1 is a block diagram showing a structure example of a policy management system according to a first embodiment.

Embodiments of the present invention will be described below with reference to the drawings. FIG. 1 is a block diagram showing a structure example of a policy management system according to a first embodiment of the present invention. The policy management system shown in FIG. 1 includes an access control policy management apparatus 1. The access control policy management apparatus 1 is a computer having a central processing unit (CPU) 100, and includes a policy database (DB) 102, a role DB 101, a policy stratifying unit 103 and a policy, ordering unit 104. FIG. 1 shows an example in which the access control policy management apparatus 1 includes all the above components, but the policy DB 102 or the role DB 101 may be mounted as another device (database system) to be connected over a network.

The policy DB 102 stores policy descriptions. The policy description is information including a policy identifier (referred to as policy ID below), a specific role identifier (referred to as role ID below), and one or more description elements prescribing an action to be permitted or prohibited per object. The policy DB 102 outputs a corresponding policy description from among the stored policy descriptions in response to the input policy ID from the policy stratifying unit 103.

The role DB 101 stores information indicating a set of subjects such as user name associated with each role ID. The information in which the role ID is associated with the subject set may be called role information below. The role DB 101 outputs a corresponding subject set from among the stored subject sets in response to the input role ID from the policy stratifying unit 103. The information stored in the role DB 101 may include, in addition to the role information, information capable of specifying inclusion relationships between subject sets contained in each item of role information. For example, information on which each subject set belongs to (such as which group the subject set belongs to in the total application range) may be included.

Figure 2:
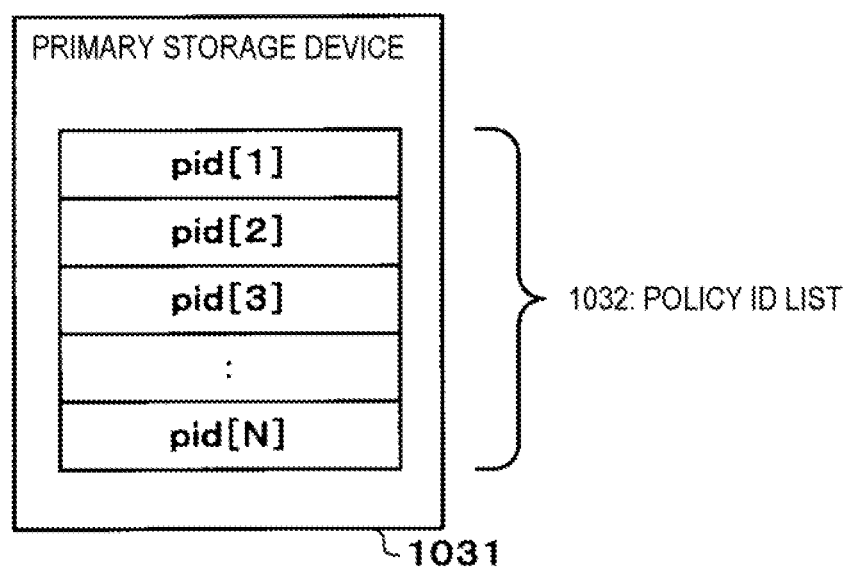
FIG. 2 is an explanatory diagram showing an exemplary primary storage device provided in a policy stratifying unit 103.

The policy stratifying unit 103 extracts a corresponding policy description from the policy DB 102 while sequentially extracting policy IDs from a policy ID list 1032 stored in an internally-provided primary storage device 1031 (see FIG. 2). The role ID described in the extracted policy description is input into the role DB 101 to extract a corresponding subject set. By assuming that the policy ID is a node, policy hierarchy data added with directed links is generated between the policy ID nodes in inclusion relationships with the extracted subject set, and is output to the policy ordering unit 104.

The policy hierarchy data is information describing a "policy hierarchy" defined as follows.

[Definition of Policy Hierarchy]

When a policy set P={p1, p2, ..., pN} is given, if each element in P is a node and arbitrary elements pi and pj have a relationship of pi<pj, a directed graph added with a directed link from pi toward pj is called policy hierarchy. A set of nodes, which are not connected with each other by directed links, among the sets of nodes adjacent to a node p is called a layer.

Figure 3:
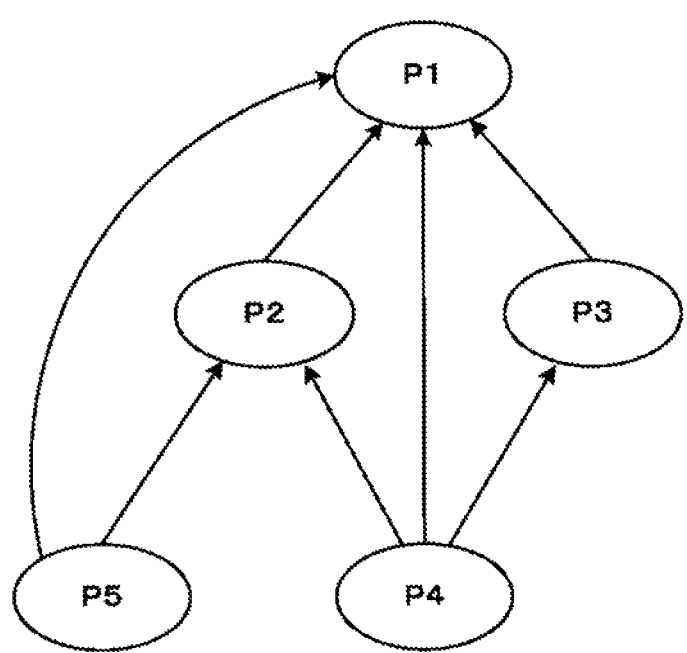
FIG. 3 is an explanatory diagram showing an exemplary policy hierarchy.

For example, in the example of the policy set shown in the definition of the total order of the policy set, a policy hierarchy as shown in FIG. 3 is obtained. By performing topological sorting on it, the total order can be found.

In the present invention, a relationship in which the subject sets include or are included in each other is assumed as an ordering rule, and the ordering rule is applied to a set of subject sets to list each policy. Even if some of elements do not include or are not included in each other, the concept of policy hierarchy is introduced for listing the policies so as not to violate the original rule. For example, when a department-based access right is a RBAC policy, a policy hierarchy having the same type is created for an organization hierarchy to be applied from the bottom layer toward the top layer so that a plurality of RBAC policies can be applied in the correct order. The correct order here refers to an order defined based on the rule that "a policy in a lower section must be applied prior to a policy in an upper section."

The policy ordering unit 104 outputs a policy ID string indicating a policy application order which is obtained by performing the topological sorting on the policy hierarchy data output by the policy stratifying unit 103.

In the present embodiment, the policy stratifying unit 103 and the policy ordering unit 104 can be realized by the programs for realizing the functions and a CPU 100 for executing control according to the programs.

1.2. Operations

Figure 4:
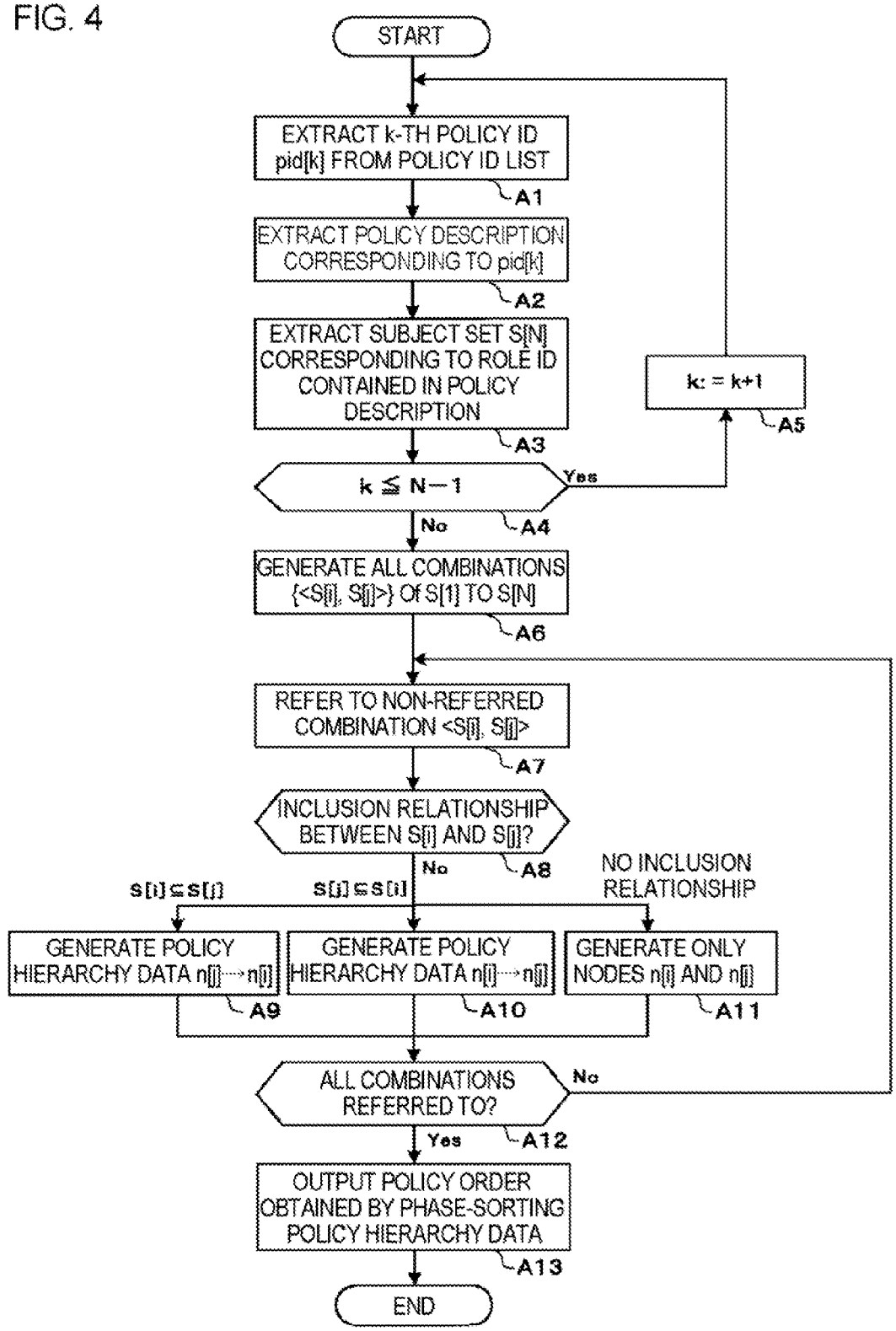
FIG. 4 is a flowchart showing exemplary operations of the first embodiment.

The operations of the present embodiment will be described below. FIG. 4 is a flowchart showing exemplary operations of the policy management system (more specifically, the access control policy management apparatus 1) according to the present embodiment.

In the example shown in FIG. 4, the policy stratifying unit 103 first scans the policy ID list 1032 including N policy IDs from the head, and extracts the k-th policy ID of pid[k] (step A1). The initial value of k is 1.

Subsequently, pid[k] is input into the policy DB 102 to acquire a corresponding policy description p[k] (step A2), and a role ID of rid[k] included in p[k] is input into the role DB 101 to acquire a corresponding subject set S[k] (step A3). At this time, a combination of <pid[k], S[k]> is pushed into a stack area of the primary storage device 1031 (is stored in the LIFO system).

The above processing is repeated for all the N policy IDs (steps A4 to A5).

When all the processing is completed for the policy ID list 1032 (k=N), the policy stratifying unit 103 performs the following operations. The stack area stores <pid[1], S[1]>, <pid[2], S[2]>, ..., <pid[N], S[N]> (referred to as <pid[1], S[1]> to <pid[N], S[N]> below).

The policy stratifying unit 103 generates all the combinations {<S[1], S[2]>, <S[1], S[3]>, ..., <S[1], S[N]>, ..., <S[N−1], S[N]>} utilizing arbitrary two of S[1] to S[N] contained in the input for <pid[1], S[1]> to <pid[N], S[N]> (step A6), and repeats the operations in steps A7 to A12 described later for each combination.

At first, it is assumed that <S[i], S[j]> is referred to in step A7. The policy stratifying unit 103 judges an inclusion relationship between S[i] and S[j] (step A8). The policy stratifying unit 103 judges which of (i) S[i]⊆S[j], (ii) S[j]⊆[i] and (iii) no inclusion relationship they are as a judgment result, and operates as follows for each case. The inclusion relationship between subject sets may be judged by referring to the information on attribution of each subject set stored in the role DB 101, for example.

In the case of (i) S[i]⊆S[j], nodes n[i] and n[j] corresponding to pid[i] and pid[j] are generated, respectively, to generate a directed link from n[i] toward n[j] (step A9).

In the case of (ii) S[j]⊆S[i], nodes n[i] and n[j] corresponding to pid[i] and pid[j] are generated, respectively, to generate a directed link from n[j] toward n[i] (step A10).

In the case of (iii) no inclusion relationship, nodes n[i] and n[j] corresponding to pid[i] and pid[j] are generated, respectively (step A11).

Figure 5:
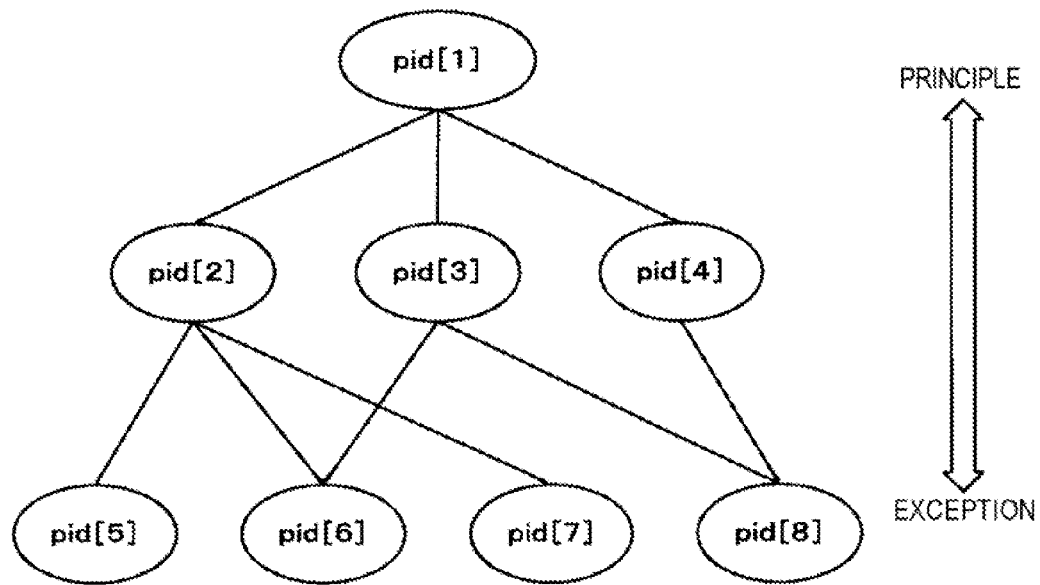
FIG. 5 is an explanatory diagram showing an exemplary policy hierarchy.

Through the above operations, the policy stratifying unit 103 generates policy hierarchy data indicating a policy hierarchy as shown in FIG. 5, and inputs the generated policy hierarchy data into the policy ordering unit 104. FIG. 5 is an explanatory diagram showing an exemplary policy hierarchy. FIG. 5 shows an example in which pid[1] to pid[8] are to be processed and shows that policies corresponding to the upper-positioned nodes are principle policies and policies corresponding to the lower-positioned nodes are exceptional policies.

Then, the policy ordering unit 104 scans the input policy hierarchy data, performs topological sorting to decide a policy order, and outputs a policy ID string indicating the decided policy order (step A13). The topological sorting is a sorting method for arranging all the elements in one line while meeting the condition that when an ordering rule and sets to be listed are given, "during sort output, for arbitrary two elements a, b arranged in the order of a.fwdarw.b, a.fwdarw.b at least does not violate the ordering rule, that is, arranged in the order given by the rule or in a combination to which the rule is not applicable."

Figure 6:
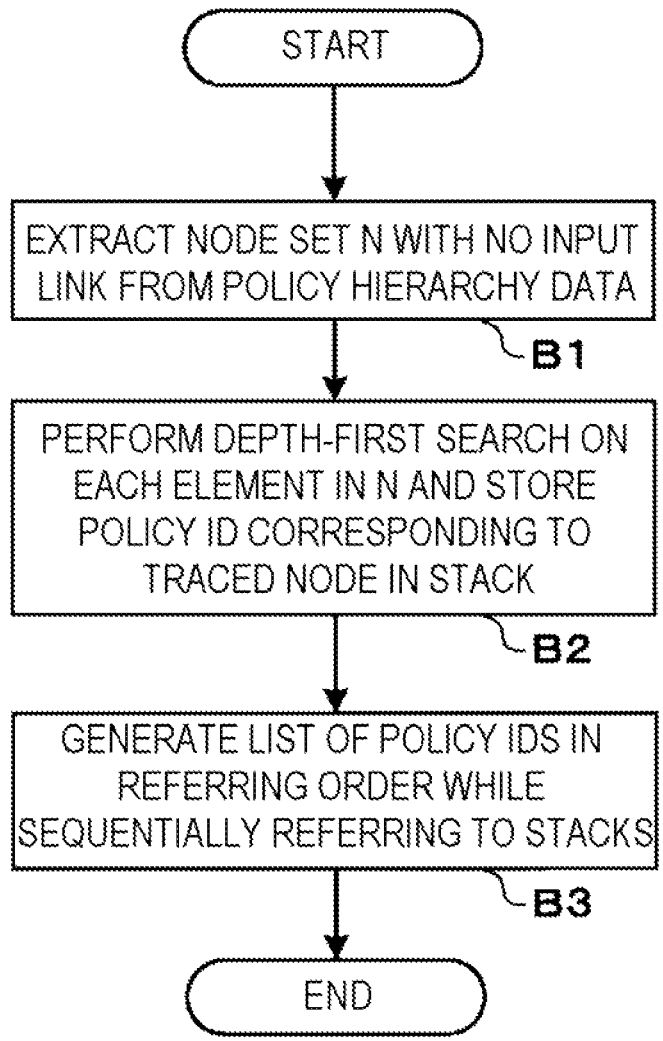
FIG. 6 is a flowchart showing an exemplary processing flow of topological sort processing.

FIG. 6 is a flowchart showing an exemplary processing flow of the topological sort processing by the policy ordering unit 104. In the example shown in FIG. 6, the policy ordering unit 104 first scans the input policy hierarchy data to extract a set N of nodes that has no input link (step B1).

Then, with each element in N as an origin, the following step B2 is recursively performed on the policy hierarchy data according to depth-first search.

In step B2, when the node being referred to meets the following condition, the node is added to a predetermined stack. When the condition is met, the node being referred to is added with a visited flag.

(Condition): The node has no output link, or if any, all the link destination nodes are added with visited flags.

While extracting the nodes from the stack one by one, a list of pid[k] as policy ID corresponding to the number k given to the node is generated (step B3).

1.3. Effects

The policy IDs in the generated list in the above manner are arranged in the order of "deep layer→shallow layer" in the elements in N which are the corresponding nodes for the policy hierarchy data. For example, when a directed path from node n[j] toward n[i] is present, that is, when n[j] is present at a deeper layer than n[i], pid[j] and pid[i] appear in the list in this order. Since the subject sets corresponding to pid[i] and pid[j] are surely in a relationship of S[j]⊆S[i], there can be obtained the effect that the inclusion relationship between the policy descriptions corresponding to pid[i] and pid[j] is kept by the policy hierarchy data generating method in steps A8 to A11.

In other words, according to the present embodiment, the total order of the policy sets can be uniquely obtained based on the inclusion relationships between the subject sets having a partial order structure.

1.4. Specific Examples

Figure 7:
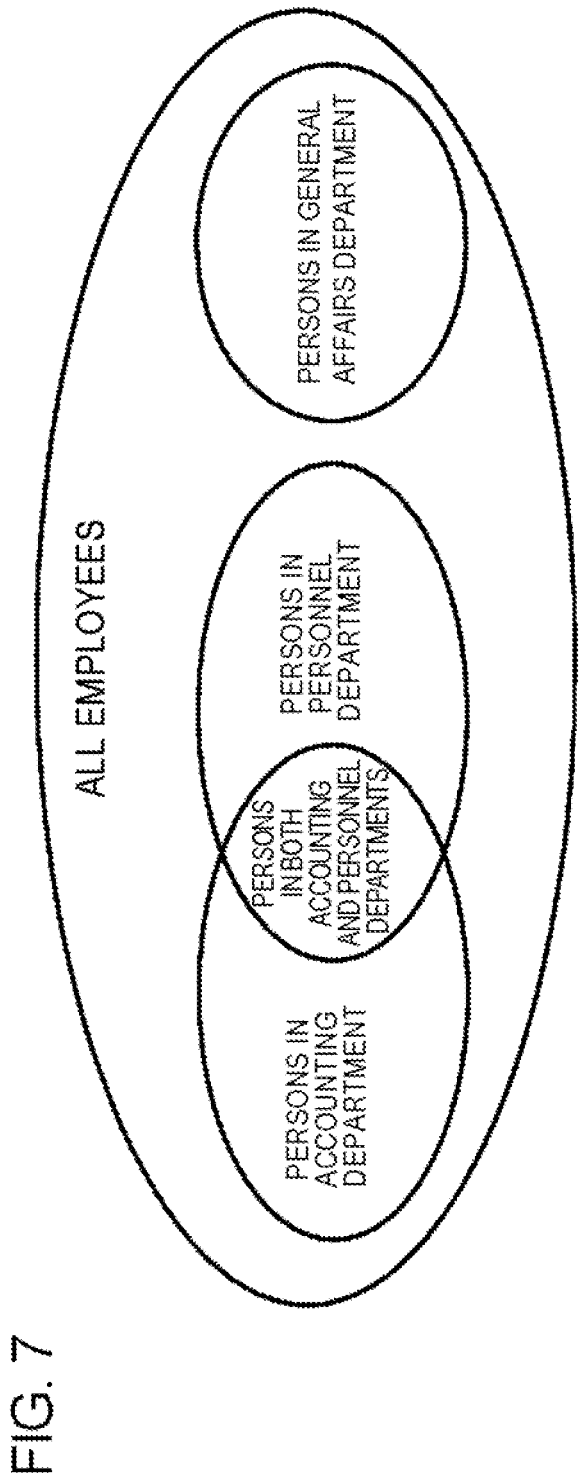
FIG. 7 is an explanatory diagram showing a specific example of inclusion relationships between subject sets.

The operations of the present embodiment will be described below by way of more specific examples. At first, it is assumed that four sets including "all employees", "accounting department", "personnel department", "personals in general affairs department" and "personals concurrently in both accounting and personnel departments" are stored as the subject sets stored in the role DB 101, and the mutual inclusion relationships are as shown in FIG. 7.

The policy DB 102 stores the policy descriptions having the following contents as the policies corresponding to the four subject sets, respectively.

Policy ID=p1: <company-wide policy> Users in the all-employees role are permitted to access the company-wide common Web server.

Policy ID=p2: <Accounting department policy> Users in the accounting department role are permitted to access an accounting department file server.

Policy ID=p3: <Personnel department policy> Users in the personnel department role are permitted to access a personnel department group web server.

Policy ID=p4: <General affairs department policy> Users in the general affairs department role are permitted to access a general affairs department file server.

policy ID=p5: <Accounting/personnel policy> users in the accounting/personnel role are prohibited to access the accounting department file server and prohibited to access the personnel department group web server.

It is assumed that the policy ID list 1032 of the policy stratifying unit 103 describes the above policy IDs in the order of "p1", "p2", "p3", "p4" and "p5." The policy description format is enough to describe "role" such as accounting department, and "resource" such as Web server or file server, but in this example, XACML (eXtende Access control Markup Language) as shown in FIG. 8 is used. FIG. 8 is an explanatory diagram showing an exemplary policy description stored in the policy DB 102.

Further, it is assumed that {keiri_ichiro, keiri_jiro, jinji_hanako, jinji_kyouko, soumu_taro} is given as the user ID of all the employees. "keiri_ichro" and "keiri_jiro" belong to the accounting department, "jinji_hanako" belongs to both the accounting department and the personnel department (concurrently in accounting/personnel), "jinji_kyouko" belongs to the personnel department, and "soumu_taro" belongs to the general affairs department, and they are associated with the subject sets, respectively.

The policy stratifying unit 103 first extracts the policy ID=p1 (pid[1]=p1) with reference to the policy ID list 1032 in step A1. Then, in step A2, pid[1]=p1 is input into the policy DB 102 to extract "all-employees policy." In step A3, the "all-employees role" as the corresponding role ID is input into the role DB 101, the subject set including the user IDs of all the employees is acquired, and a combination of policy ID and subject set is stored in the stack area.

In the first processing, pid[1]=p1 is extracted from the policy ID list 1032 to acquire S[1]={keiri_ichiro, keiri_jiro, jinji_hanako, jinji_kyouko, soumu_taro} as the subject set. Then, <p1, {keiri_ichiro, keiri_jiro, jinji_hanako, jinji_kyouko, soumu_taro}> is stored in the stack area.

The same operations are repeated on the policy ID=p2 to p5 (steps A4, A5).

In the second processing, pid[2]=p2 is extracted from the policy ID list 1032 to acquire S[2]={keiri_ichiro, keiri_jiro} as the subject set. Then, <p2, {keiri_ichiro, keiri_jiro}> is stored in the stack area.

In the third processing, pid[3]=p3 is extracted from the policy ID list 1032 to acquire S[3]={jinji_hanako, jinji_kyouko} as the subject set. Then, <p3, {jinji_hanako, jinji_kyouko}> is stored in the stack area.

In the fourth processing, pid[4]=p4 is extracted from the policy ID list 1032 to acquire S[4]={soumu_taro} as the subject set. Then, <p4, {soumu_taro}> is stored in the stack area.

In the fifth processing, pid[5]=p5 is extracted from the policy ID list 1032 to acquire S[5]={jinji_hanako} as the subject set. Then, <p5, {jinji_hanako}> is stored in the stack area.

After the repeated operations are completed after the fifth processing, the following data is stored in the stack area of the policy stratifying unit 103.

<p5, {jinji_hanako}>
<p4, {soumu_taro}>
<p3, {jinji_hanako, jinji_kyouko}>
<p2, {keiri_ichiro, keiri_jiro}>
<p1, {keiri_ichiro, keiri_jiro, jinji_hanako, jinji_kyouko, soumu_taro}>

Subsequently, the policy stratifying unit 103 extracts the five subject sets stored in the stack area, and generates ten combinations of the subject sets (step A6). The policy hierarchy data is generated from each combination.

The policy hierarchy data generating method has three ways depending on the inclusion relationship, and thus specific examples for the respective ways will be described.

(i) The Case of $S[i] \subseteq S[j]$

For example, in the case of the combination of {keiri_ichiro, keiri_jiro} and {keiri_ichiro, keiri_jiro, jinji_hanako, jinji_kyouko, soumu_taro}, since the policy ID corresponding to the former subject set is p2 and the policy ID corresponding to the latter is p1, the node p2 and the node p1 are generated to give a directed link from the node p2 toward the node p1 (step A9).

(ii) The Case of $S[j] \subseteq S[i]$

For example, in the case of the combination of {jinji_hanako, jinji_kyouko} and {jinji_hanako}, since the policy ID corresponding to the former subject set is p3 and the policy ID corresponding to the latter is p5, the node p3 and the node p5 are generated to give a directed link from the node p5 toward the node p3 (step A10). When the node p3 has been already generated in the previous operation, an overlapped node is not generated.

(iii) The Case of No Inclusion Relationship

For example, in the case of the combination of {jinji_hanako, jinji_kyouko} and {soumu_taro}, since the policy ID corresponding to the former subject set is p3 and the policy ID corresponding to the latter is p4, the node p3 and the node p5 are generated and a directed link is not given between them (step A11). When the node p3 has been already generated in the previous operation, an overlapped node is not generated.

Figure 9:
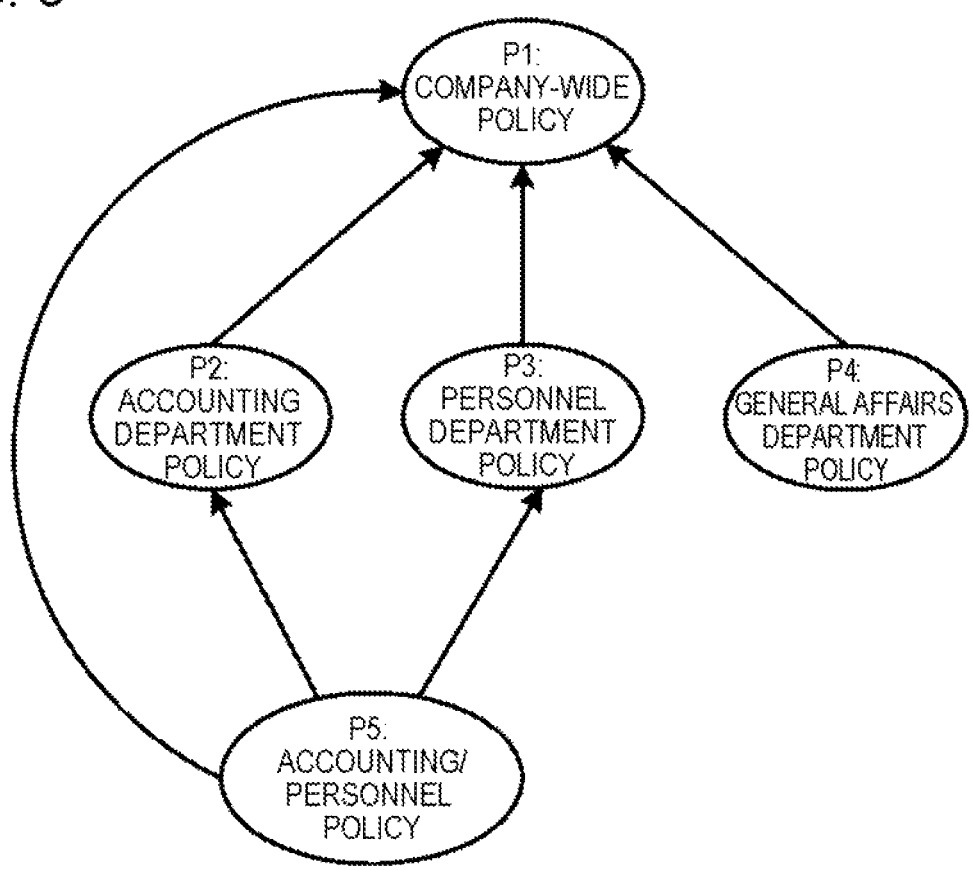
FIG. 9 is an explanatory diagram showing a specific example of a policy hierarchy.

The policy stratifying unit 103 generates the policy hierarchy data representing the policy hierarchy shown in FIG. 9 through the above operations. FIG. 9 is an explanatory diagram showing an exemplary policy hierarchy. In the example shown in FIG. 9, five nodes (nodes p1, p2, p3, p4, p5) corresponding to five policies are generated and six links are given as directed links (from the node p5 toward the node p2, from the node p5 toward the node p3, from the node p4 toward the node p1, from the node p3 toward the node p1, from the node p2 toward the node p1).

The policy ordering unit 104 performs topological sorting on the policy hierarchy data to decide the policy order (step A13).

Specifically, at first, the node set (node p4, node p5) having no input link is extracted (step B1). The depth-first search may be performed from any of the nodes, and here, it is started from the node p5.

Then, the depth-first search is performed with the node p5 as the origin, and the node p1 meeting the above condition is detected and stored in the stack (step B2). A visited flag is given to the node p1.

Since the search operation is recursively performed, the policy ordering unit 104 then makes the above condition judgment on the node p2 and the node p3. Assuming that the node p2 is being referred to, the link destination of the node p2 is only the node p1 and the visited flag is already given to the node p1 so that the node p2 meets the above condition. Then, the node p2 is stored in the stack and a visited flag is given to it. The same is applicable to the node p3. Since visited flags are finally given to all of the node p1, the node p2 and the node p3 linked from the node p5, the node p5 is also stored in the stack and a visited flag is given to it. At this time, the nodes are stored in the stack in the order of the node p5, the node p3, the node p2 and the node p1 from the beginning.

Thereafter, the depth-first search is performed with the node p4 having no input link as the origin. In this case, since only the node p1 is linked from the node p4 and the node p1 is given a visited flag, the policy ordering unit 104 simply stores the node p4 in the stack and gives a visited flag to it and terminates the search processing.

Consequently, the nodes are stored in the stack in the order of the node p4, the node p5, the node p3, the node p2 and the node p1 from the beginning.

By referring to the nodes from the beginning of the stack one by one, the policy ordering unit 104 generates a list of policy IDs corresponding to the referred nodes (step B3).

In other words, the policy ID list having the arrangement in the order of p4→p5→p3→p2→p1 is generated. This corresponds to the result in which the policy IDs are arranged in the order of "deep layer to shallow layer" in the policy hierarchy data.

2. Second Embodiment 2.1. Structure

Figure 10:
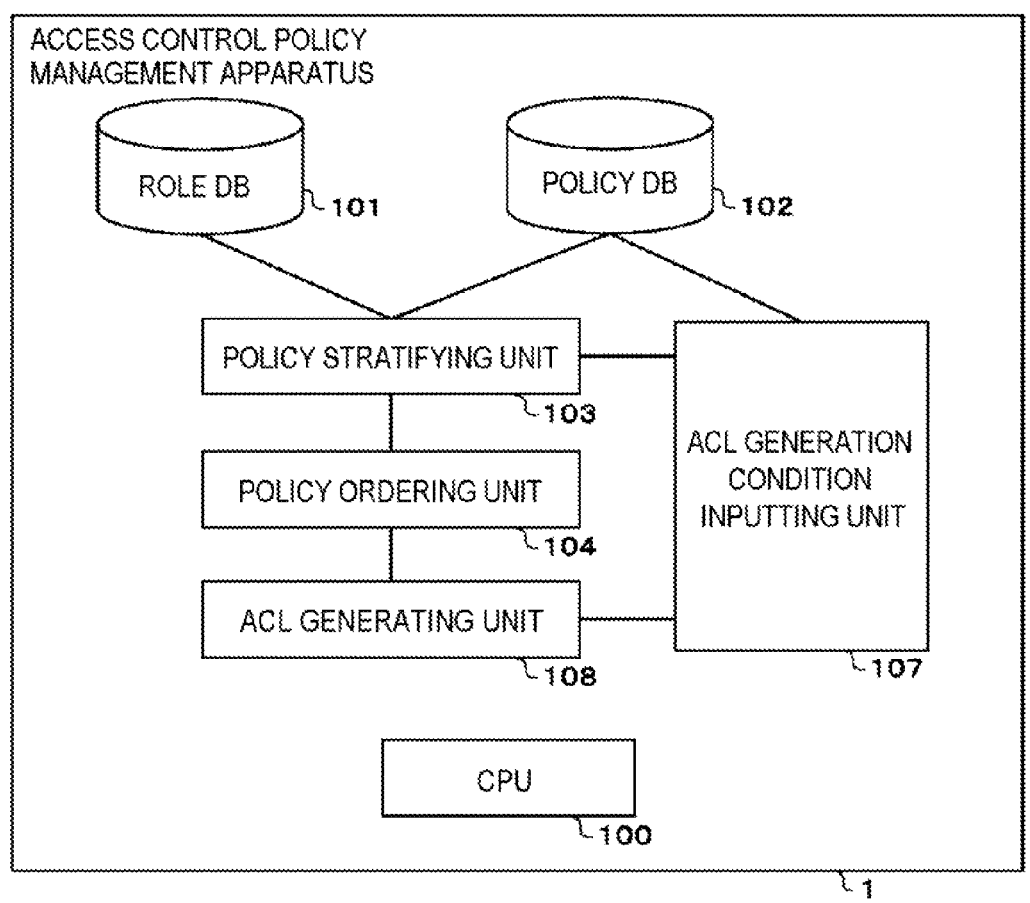
FIG. 10 is a block diagram showing a structure example of a policy management system according to a second embodiment.

A second embodiment of the present invention will be described below with reference to the drawings. FIG. 10 is a block diagram showing a structure example of a policy management system according to the second embodiment. The policy management system shown in FIG. 10 is based on the first embodiment shown in FIG. 1 and has the access control policy management apparatus 1 further including an ACL generation condition inputting unit 107 and an ACL generating unit 108.

The ACL generation condition inputting unit 107 has a user input device such as a keyboard device or a mouse device, and inputs the conditions in the form of policy ID list into the policy stratifying unit 103 in response to the input conditions for the policy conversion range. A set of policy descriptions included in the conversion range is extracted from the policy DB 102 and is input into the ACL generating unit 108.

The ACL generating unit 108 has a secondary storage device, and sequentially converts the policy descriptions input from the ACL generation condition inputting unit 107 into the ACL descriptions, respectively, in the policy order input from the policy ordering unit 104 by referring to the role DB 101, and stores the conversion results (ACL descriptions) into the secondary storage device.

In the present embodiment, the ACL generation condition inputting unit 107 can be achieved by a user input device, a program for realizing the functions of receiving and converting the data input, and the CPU 100 for executing control according to the program. The ACL generating unit 108 can be achieved by a program for realizing its function, and the CPU 100 for executing control according to the program.

2.2. Operations

Figure 11:
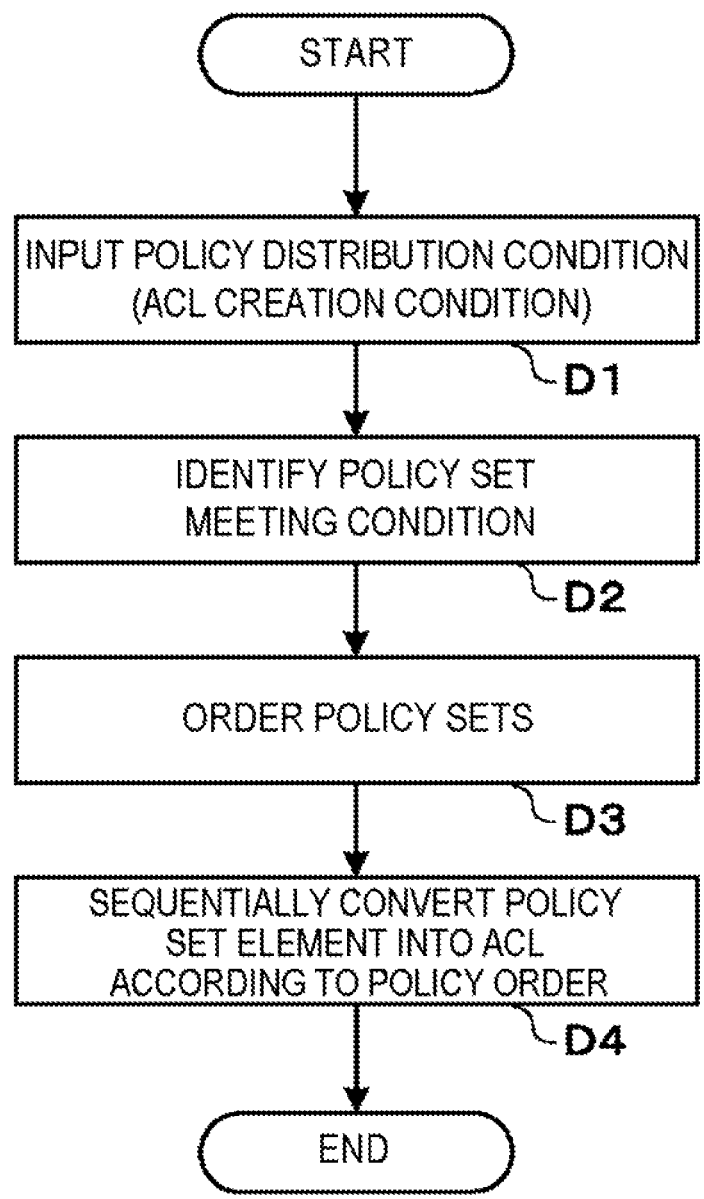
FIG. 11 is a flowchart showing exemplary operations of the second embodiment.

FIG. 11 is a flowchart showing exemplary operations of the policy management system according to the present embodiment (more specifically, the access control policy management apparatus 1). In the example shown in FIG. 11, the ACL generation condition inputting unit 107 receives an instruction input of a policy distribution condition (which may also be referred to as the ACL generation condition) by the user input device (step D1). The condition includes at least a policy generation range. Any condition can be instructed for the policy generation range, if only it can specify a set of policy descriptions stored in the policy DB 102, such as "all the policies stored in the policy DB", "policy for which ACL generation was not instructed in the past" or "policy corresponding to designated role set".

Then, by referring to the policy DB 102 according to the input condition for the policy generation range, the ACL generation condition inputting unit 107 identifies the policy set that meets the condition (step D2). When the policy descriptions are stored in the policy DB 102 according to the policy DB schema, for example, as shown in FIG. 12, the policy set identifying method can identify the policy ID that meets the condition with reference to the ACL-generated flag column or role ID column corresponding to the generation range condition. More specifically, a view may be generated by the following SQL sentences.

Example of presence/absence of ACL generation: SELECT policy ID FROM policy DB WHERE AL generation flag=0 (here, a value indicating not-generated)

Example of role ID: SELECT policy ID FROM policy DB WHERE role ID=(designated role ID[1]) OR role ID=(designated role ID[2]) OR . . . .

Upon extracting the policy set as the set of policy IDs capable of being stored in the policy ID list 1032 in this way, the ACL generation condition inputting unit 107 copies (stores) the list of policy sets (policy ID list) to the primary storage device 1031 of the policy stratifying unit 103. The corresponding set of policy descriptions is extracted from the policy ID list in the policy DB 102 and is input into the ACL generating unit 108.

Thereafter, similar to the operations in steps A1 to A13 of the first embodiment, the policy stratifying unit 103 and the policy ordering unit 104 generate the policy order data for the set of policies stored in the primary storage device 1031 of the policy stratifying unit 103 (step D3).

The ACL generating unit 108 converts each policy description input from the ACL generation condition inputting unit 107 into an ACL description according to the policy order data input from the policy ordering unit 104, and adds it to the same file in the secondary storage device (step D4).

Figure 13:
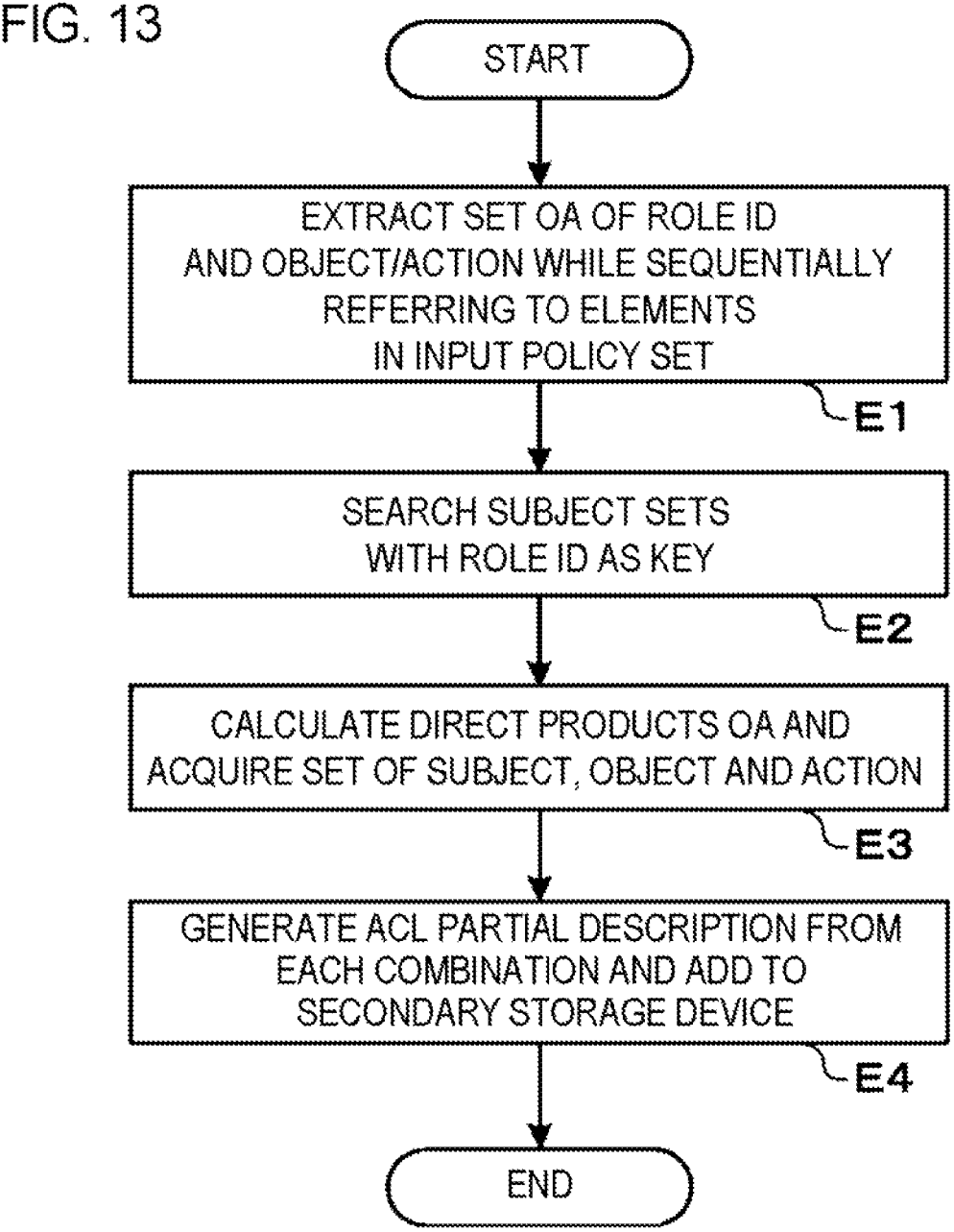
FIG. 13 is a flowchart showing an exemplary processing flow of processing of converting into an ACL description.

The method for converting a policy description into an ACL description will be described below more specifically with reference to FIG. 13. FIG. 13 is a flowchart showing an exemplary processing flow of the processing of converting into an ACL description. In the example shown in FIG. 13, the ACL generating unit 108 first extracts a set OA of role ID and combinations of object/action contained in the policy description being currently referred to (step E1). Here, the object refers to a file or computer to be accessed, and the action refers to an operation to be performed on the object (such as read or write from/into a file).

Then, the role ID is input into the role DB 101 to acquire a corresponding subject set S (step E2). Thereafter, a direct product S×OA of the subject set S and a combination of the object/action OA is calculated (step E3).

For example, in the case of S={sato, suzuki, tanaka}, OA={(file 1, read-only), (file 2, read-write)}, the following six combinations of (S, O, A) are obtained.
(1) (sato, file 1, read-only)
(2) (sato, file 2, read-write)
(3) (suzuki, file 1, read-only)
(4) (suzuki, file 2, read-write)
(5) (tanaka, file 1, read-only)
(6) (tanaka, file 2, read-write)

Finally, the combinations of (S, O, A) are converted into the ACL descriptions, respectively, and are added to the secondary storage device (step E4). Any ACL description form can be used if only S, O, A are identifiable. For example, when a CSV (Comma, Separated Values) form for listing each element in a comma-delimited manner is used, the following ACL descriptions may be generated.
(1) sato, file 1, read-only (linefeed mark)
(2) sato, file 2, read-write (linefeed mark)
(3) suzuki, file 1, read-only (linefeed mark)
(4) suzuki, file 2, read-write (linefeed mark)
(5) tanaka, file 1, read-only (linefeed mark)
(6) tanaka, file 2, read-write (linefeed mark)

2.3. Effects

As described above, according to the present embodiment, the exception/principle relationship between policies can be appropriately converted into the ACL description, that is, in preference to the exception. This is because the policy stratifying unit 103 arranges an exceptional policy at a deeper layer and generates policy hierarchy data, and the policy ordering unit 104 orders the policy IDs from a deeper layer toward a shallower layer of the policy hierarchy data and converts the data into the ACL description based on the order.

3. Third Embodiment 3.1. Structure

Figure 14:
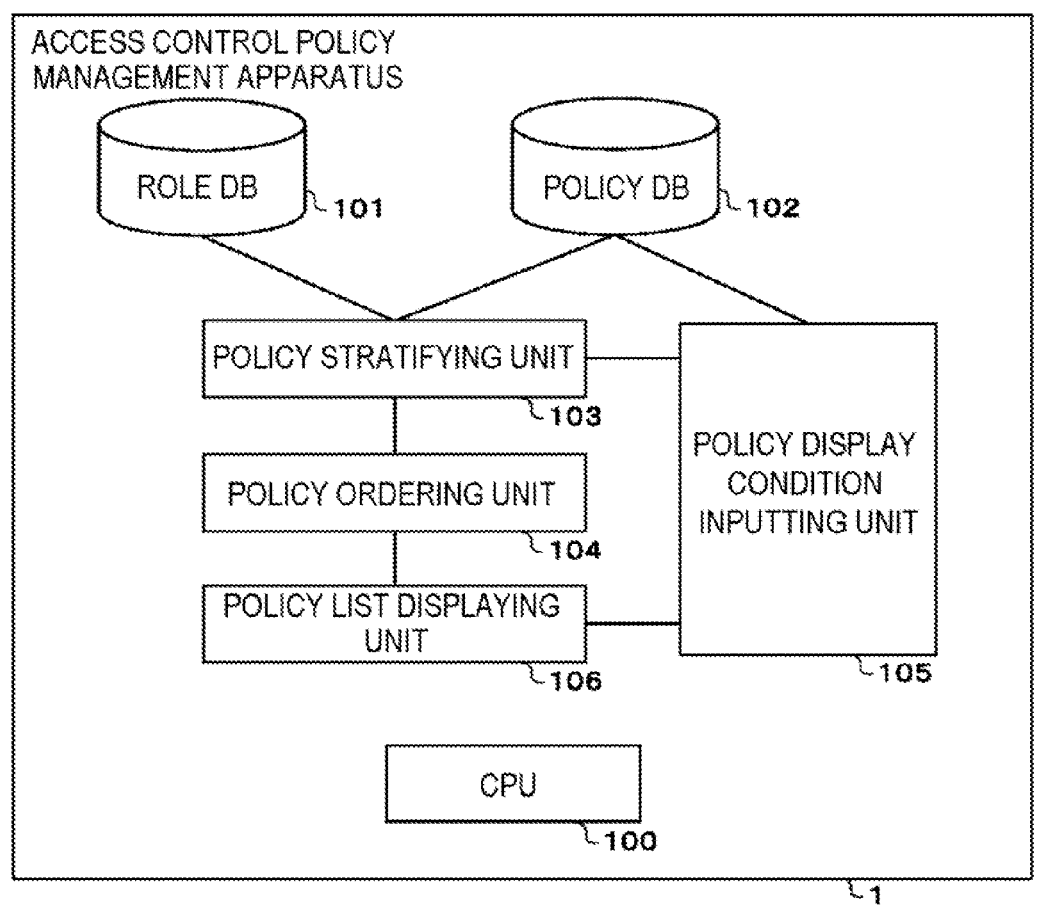
FIG. 14 is a block diagram showing a structure example of a policy management system according to a third embodiment.

A third embodiment of the present invention will be described below with reference to the drawings. FIG. 14 is a block diagram showing a structure example of a policy management system according to the third embodiment. The policy management system shown in FIG. 14 is based on the first embodiment shown in FIG. 1, and the access control policy management apparatus 1 further includes a policy display condition inputting unit 105 and a policy list displaying unit 106.

The policy display condition inputting unit 105 has a user input device such as a keyboard device or a mouse device, and converts the policy display range into the policy ID list in response to the input condition for the policy display range and display order, and inputs it into the policy stratifying unit 103. The display order is input into the policy list displaying unit 106.

The policy list displaying unit 106 has a display device such as a liquid crystal display device (LCD), and upon receiving an input of the display condition for displaying in the policy order from the policy display condition inputting unit 105, lists up information (such as policy ID) of each policy on the display device in the policy order output from the policy ordering unit 104.

In the present embodiment, the policy display condition inputting unit 105 can be achieved by a user input device, a program for realizing the functions of receiving and converting the data input, and the CPU 100 for executing control according to the program. The policy list displaying unit 106 can be achieved by a program for realizing its function, the CPU 100 for executing control according to the program, and the display device.

3.2. Operations

Figure 15:
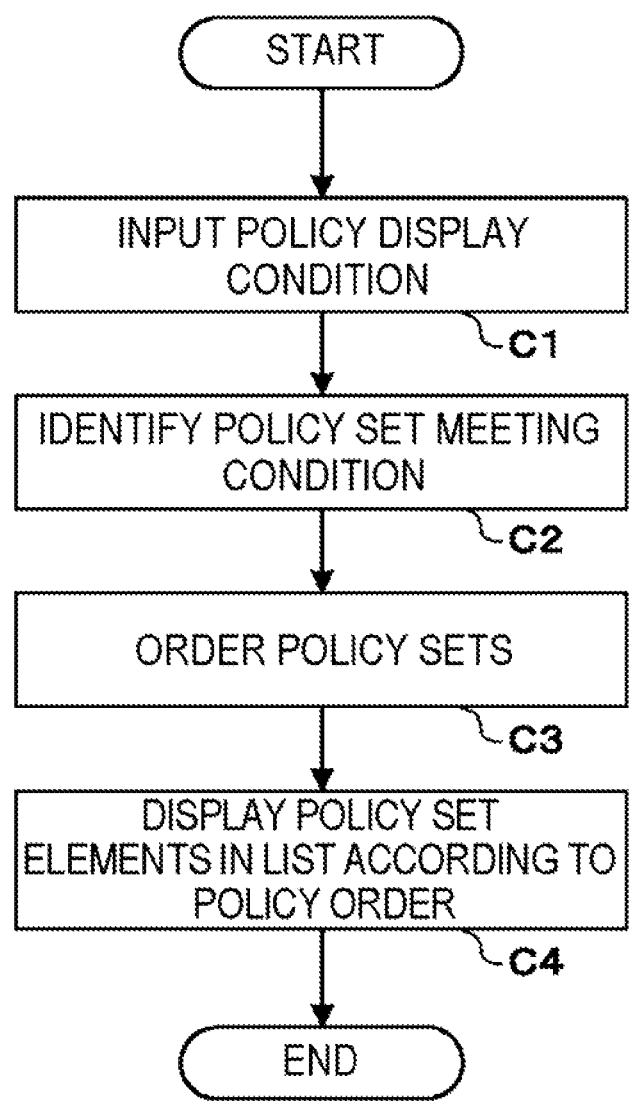
FIG. 15 is a flowchart showing exemplary operations of the third embodiment.

FIG. 15 is a flowchart showing exemplary operations of the policy management system according to the present embodiment (more specifically, the access control policy management apparatus 1). In the example shown in FIG. 15, the policy display condition inputting unit 105 receives an instruction input of the display condition from the user input device (step C1). The display condition includes at least the condition for policy display range and display order. For the policy display range, any condition can be designated if only it can specify a set of policy descriptions stored in the policy DB 102 such as "all the policies stored in the policy DB", "period for update date and time", and "policy-creating manager ID". For the display order, in addition to "policy application order", "policy name dictionary order" or "policy update date and time order" may be designated.

Next, by referring to the policy DB 102 according to the input condition for the policy display range, the policy display condition inputting unit 105 identifies a policy set that meets the condition (step C2). For the policy set identifying method, when the policy descriptions are stored in the policy DB 102 according to the policy DB schema as shown in FIG. 16, for example, the policy ID that meets the condition can be identified by referring to the update date and time column or manager ID column corresponding to the display range condition. More specifically, a view may be generated by the following SQL sentences.

Example of update date and time: SELECT policy ID FROM policy DB WHERE (start of designated period) <update time AND update date and time <(end of designated period)

Example of manager ID: SELECT policy ID FROM policy DB WHERE manager ID=(designated manager ID)

If a policy set is extracted as a set of policy IDs capable of being stored in the policy ID list 1032, the policy display condition inputting unit 105 copies (stores) the list of policy sets (policy ID list) into the primary storage device 1031 of the policy stratifying unit 103. The accepted display condition is input into the policy list displaying unit 106.

Figure 17:
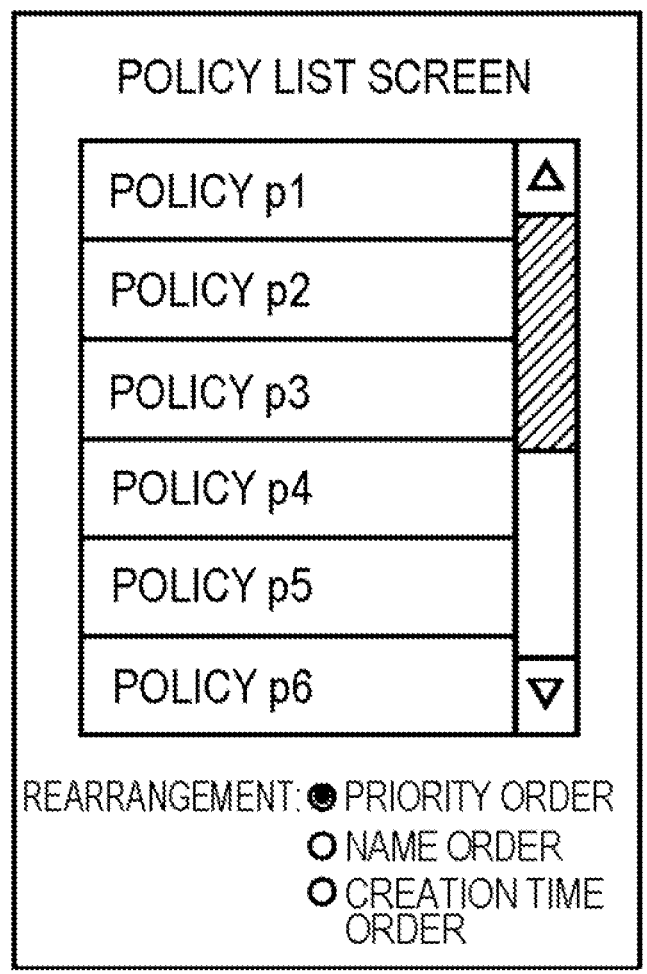
FIG. 17 is an explanatory diagram showing an exemplary list screen displaying a policy order.
Figure 18:
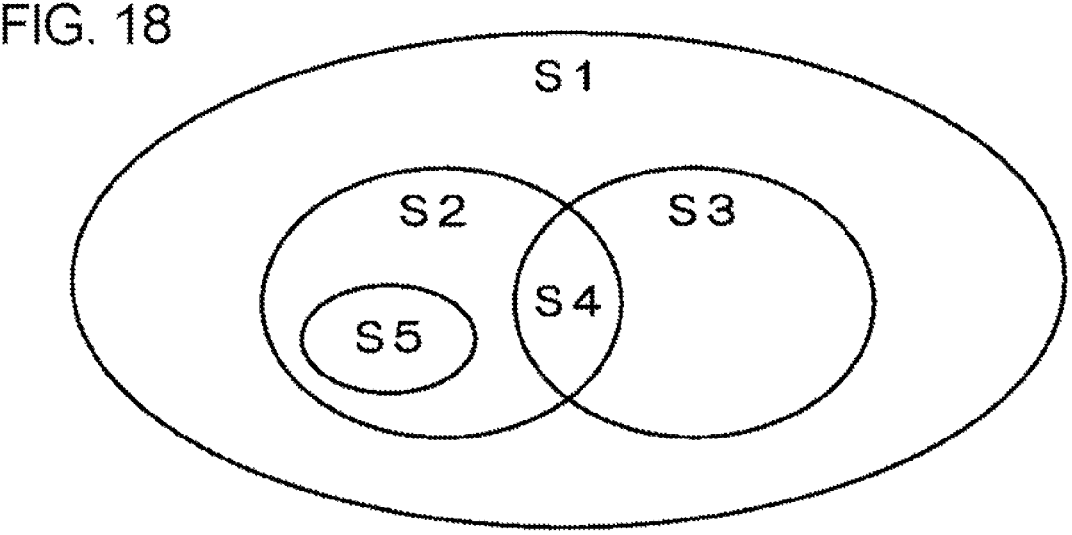
FIG. 18 is an explanatory diagram showing exemplary inclusion relationships between subject sets.

Thereafter, the policy stratifying unit 103 and the policy ordering unit 109 generate policy order data for the policy set by the operations similar to those in steps A1 to A13 according to the first embodiment (step C3). The policy list displaying unit 106 displays the policy ID or associated policy name as each element in the policy set according to the generated policy order data on the display device (step C4). The policy list displaying unit 106 may display a list screen as shown in FIG. 17, for example. In the example shown in FIG. 17, the list is displayed in the policy-ID-designated order. There is displayed a radio button for selecting any of "priority order", "name order" and "creation date and time order" as display order switching instruction.

3.3. Effects

As described above, according to the present embodiment, the list is displayed in the policy order so that the policy manager as the user of the access control policy management apparatus 1 can intuitively recognize the order in which the policy is applied, and can easily find an inconsistency between the policies. For example, the policy manager can find another policy which is inconsistent with his created policy and is actually applied, only by validating a policy displayed later than the policy created by him (that is, low-priority policy).

Figure 19:
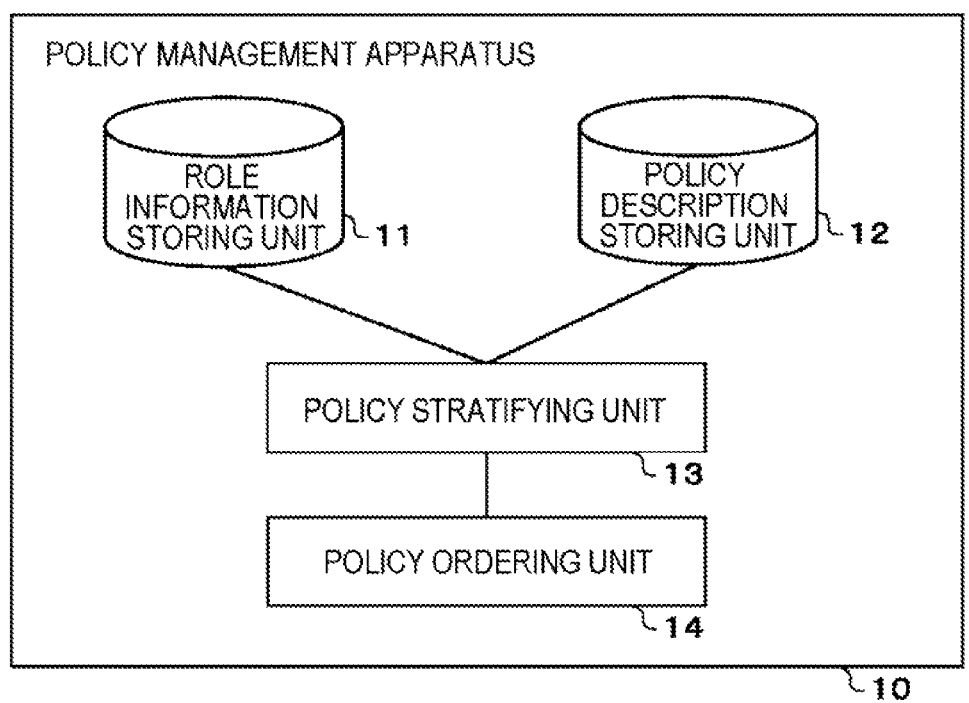
FIG. 19 is a block diagram showing the outline of the present invention.

The outline of the present invention will be described below. FIG. 19 is a block diagram showing the outline of the present invention. A policy management apparatus 10 according to the present invention includes a role information storing unit 11, a policy description storing unit 12, a policy stratifying unit 13 and a policy ordering unit 14.

The role information storing unit 11 (such as role DB 101) stores role information including information indicative of a subject set to which a policy is to be applied, and information capable of specifying inclusion relationships between subject sets contained in the role information.

The policy description storing unit 12 (such as policy DB 102) stores policy descriptions including information indicative of a policy and information for identifying a subject set to which the policy is to be applied.

The policy stratifying unit 13 (such as policy stratifying unit 103) generates a policy hierarchy including a layer configured of a policy that is applied to a subject set not in an inclusion relationship based on the inclusion relationships between the subject sets to which each policy is applied by assuming that each policy is a node for two or more policies stored in the policy description storing unit 12.

The policy stratifying unit 13 may generate policy hierarchy by generating policy hierarchy data with directed links added among policy nodes in inclusion relationships between subject sets, for example.

The policy ordering unit 14 (such as policy ordering unit 104) totally orders the policy sets made of two or more policies to be totally ordered while maintaining the hierarchy relationship between policies in different layers based on the information indicating the policy hierarchy generated by the policy stratifying unit 13.

The policy ordering unit 14 may totally order the policy sets to be totally ordered by performing topological sorting on the policy hierarchy data according to the depth-first search with each element in the node set having no input link as the origin.

With the structure, the inclusion relationships between policies are derived from the inclusion relationships between subject sets and the total order of the policy sets can be uniquely found based on the derived inclusion relationships between policies so that the policy set concurrently including positive policies and negative policies can be correctly converted into a single access control rule.

Figure 20:
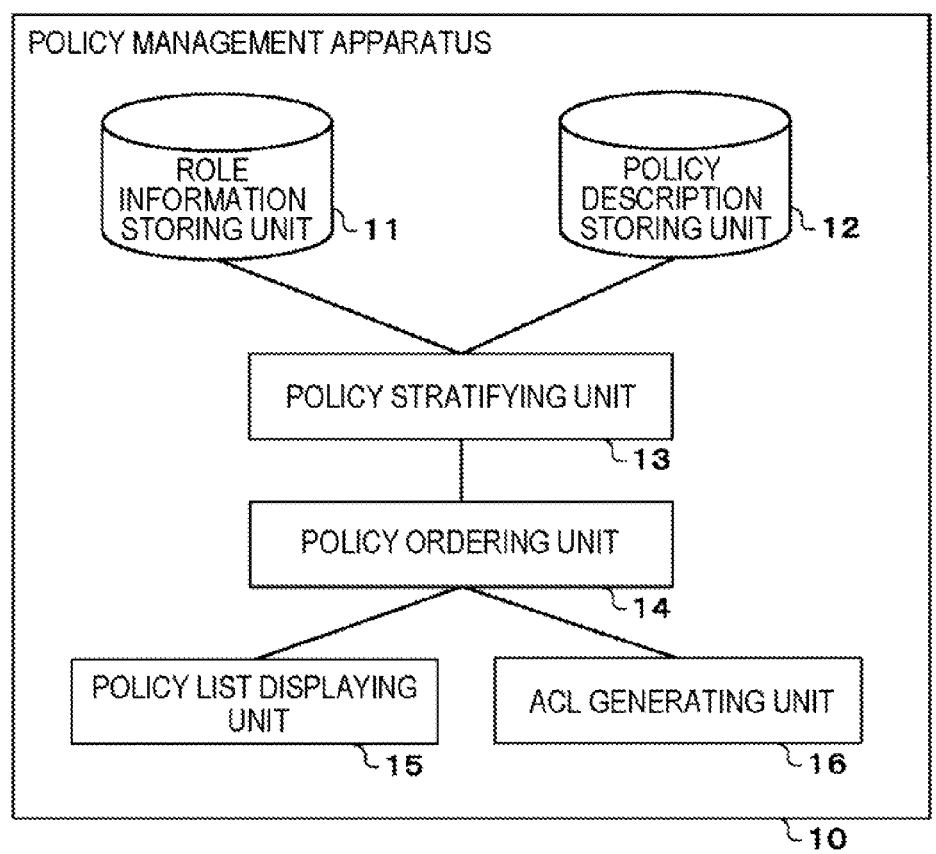
FIG. 20 is a block diagram showing another structure example of a policy management apparatus as the outline of the present invention.

FIG. 20 is a block diagram showing another structure example of the policy management apparatus as the outline of the present invention. For example, as shown in FIG. 20, the policy management apparatus 1 according to the present invention may further include a policy list displaying unit 15.

The policy list displaying unit 15 (such as policy list displaying unit 106) arranges elements in a policy set to be totally ordered and lists up the same in the policy order decided as the total order by the policy ordering unit 14.

With the structure, for each element in the policy set, the description orders in the single ACL can be listed up so that the policy validation by the policy manager can be assisted.

As shown in FIG. 20, the policy management apparatus 1 according to the present invention may further include an ACL generating unit 16.

The ACL generating unit 16 (such as ACL generating unit 108) converts each policy description contained in the policy set to be totally ordered into an ACL description in the policy order decided as the total order by the policy ordering unit.

With the structure, since a single ACL can be generated in a description order conforming to the total order for the policy set containing both positive policies and negative policies, access control according to an exceptionally decided policy can be appropriately performed in the access control mechanism.

In addition to the example in which one physically-separated apparatus (policy management apparatus) has all the units as shown in FIGS. 19 and 20, two or more physically-separated apparatuses may include the units shown in FIGS. 19 and 20 as stated above and may be connected in a wired or wireless manner to configure the policy management system.

For example, the policy management system may be configured of a role storing device including a role information storing unit, a policy description storing device including a policy description storing unit, and a policy total ordering device including a policy stratifying unit and a policy ordering unit. The policy totally-ordering device may further include a policy list displaying unit or ACL generating, unit.

With the structure, in a large scale environment in which many items of role information and/or policy descriptions are present, a plurality of policy totally-ordering devices are provided so that load dispersion can be achieved.

[Industrial Applicability]

The present invention is applicable to a policy searching apparatus for generating a search view according to a policy order for policies in a database, or a policy distributing apparatus for setting a generated access control list in a remote server.

The invention claimed is:

1. A policy management apparatus comprising:
   a role information storing unit that stores role information including information indicative of subject sets to which policies are to be applied, and information capable of specifying inclusion relationships between subject sets contained in said role information;
   a policy description storing unit that stores policy descriptions including information indicative of policies and information for identifying subject sets to which said policies are to be applied;
   a policy stratifying unit that, for two or more policies stored in said policy description storing unit, generates a policy hierarchy map in which each of two or more policies are stratified within said policy hierarchy map based on inclusion relationships between subject sets to which each of said two or more policies are applied by assuming that each policy is a node; and
   a policy ordering unit that orders policy sets made of said two or more policies in a row by arranging said two or more policies in an order of deep layer to shallow layer or order of shallow layer to deep layer based on said policy hierarchy map generated by said policy stratifying unit.

2. The policy management apparatus according to claim 1, comprising a policy list displaying unit that arranges elements in a policy set to be totally ordered in one line according to a policy order decided as a total order by said policy ordering unit and lists up said elements.

3. The policy management apparatus according to claim 1, comprising an Access Control List (ACL) generating unit that converts each policy description contained in a policy set to be totally ordered into an ACL description according to a policy order decided as a total order by said policy ordering unit.

4. The policy management apparatus according to claim 1, wherein said policy stratifying unit generates policy hierarchy data with directed links added between policy nodes in inclusion relationships between subject sets, thereby generating a policy hierarchy.

5. The policy management apparatus according to claim 4, wherein said policy ordering unit performs topological sorting on policy hierarchy data according to depth-first search with each element in a node set having no input link as an origin, thereby totally ordering policy sets to be totally ordered.

6. A policy management system comprising:
a role storing device comprising a role information storing unit that stores role information including information indicative of subject sets to which policies are to be applied, and information capable of specifying inclusion relationships between subject sets contained in said role information;
a policy description storing device comprising a policy description storing unit that stores policy descriptions including information indicative of policies and information for specifying subject sets to which said policies are to be applied; and
a policy totally-ordering device comprising:
a policy stratifying unit that, for two or more policies stored in said policy description storing unit, generates a policy hierarchy map in which each of two or more policies are stratified within said policy hierarchy map, including a layer made of a policy applied to a subject set not in an inclusion relationship, based on inclusion relationships between subject sets to which each of said two or more policies are applied by assuming that each policy is a node; and
a policy ordering unit that orders policy sets made of said two or more policies in a row by arranging each of said two or more policies in an order of deep layer to shallow layer or in an order of shallow layer to deep layer based on said policy hierarchy map generated by said policy stratifying unit.

7. The policy management system according to claim 6, wherein said policy totally-ordering device further comprises a policy list displaying unit that arranges elements in a policy set to be totally ordered according to a policy order decided as a total order by said policy ordering unit and lists up said elements.

8. The policy management system according to claim 6, wherein said policy totally-ordering device further comprises an Access Control List (ACL) generating unit that converts each policy description contained in a policy set to be totally ordered into an ACL description according to a policy order decided as a total order by said policy ordering unit.

9. A policy ordering method, for given subject sets for which inclusion relationships between subject sets can be specified, and policy sets in which subject sets to be applied are indicated, comprising:
a policy stratifying step for two or more policies contained in said policy sets, for generating a policy hierarchy map in which each of two or more policies are stratified within said policy hierarchy map, including a layer made of a policy to be applied to a subject set not in an inclusion relationship, based on inclusion relationships between subject sets to which each of said two or more policies are applied by assuming that each policy is a node; and
a policy ordering step for ordering policy sets made of said two or more policies in a row by arranging each of said two or more policies in an order of deep layer to shallow layer or an order of shallow layer to deep layer based on said policy hierarchy map generated in said policy stratifying step.

10. A policy list displaying method, for given subject sets for which inclusion relationships between subject sets can be specified, and policy sets in which subject sets to be applied are indicated, comprising:
a policy stratifying step for two or more policies contained in said policy sets, for generating a policy hierarchy map in which each of two or more policies are stratified within said policy hierarchy map, including a layer made of a policy to be applied to a subject set not in an inclusion relationship, based on inclusion relationships between subject sets to which each of said two or more policies are applied by assuming that each policy is a node;
a policy ordering step for ordering policy sets made of said two or more policies in a row by arranging each of said two or more policies in an order of deep layer to shallow layer or in an order of shallow layer to deep layer based on said policy hierarchy map generated in said policy stratifying step; and
a list displaying step for arranging elements in a policy set to be totally ordered according to a policy order decided as a total order in said policy ordering step and listing up said elements.

11. An Access Control List (ACL) generating method, for given subject sets for which inclusion relationships between subject sets can be specified, and policy sets in which subject sets to be applied are indicated, comprising:
a policy stratifying step for two or more policies contained in said policy sets, for generating a policy hierarchy map in which each of two or more policies are stratified within said policy hierarchy map, including a layer made of a policy to be applied to a subject set not in an inclusion relationship, based on inclusion relationships between subject sets to which each of said two or more policies are applied by assuming that each policy is a node;
a policy ordering step for ordering policy sets made of said two or more policies in a row by arranging each of said two or more policies in an order of deep layer to shallow layer or in an order of shallow layer to deep layer based on said policy hierarchy map generated in said policy stratifying step; and
an ACL generating step for converting each policy description contained in a policy set to be totally ordered into an ACL description according to a policy order decided as a total order in said policy ordering step.

12. A non-transitory information storage medium storing a policy ordering program, for given subject sets for which inclusion relationships between subject sets can be specified, and policy sets in which subject sets to be applied are indicated, which causes a computer to perform:
policy stratifying processing that, for two or more policies contained in said policy sets, generates a policy hierarchy map in which each of two or more policies are stratified within said policy hierarchy map, including a layer made of a policy to be applied to a subject set not in an inclusion relationship, based on inclusion relationships between subject sets to which each of said two or more policies are applied by assuming that each policy is a node; and
policy ordering processing that orders policy sets made of said two or more policies in a row by arranging each of said two or more policies in an order of deep layer to shallow layer or in an order of shallow layer to deep layer based on said policy hierarchy map generated in said policy stratifying processing.

13. A non-transitory information storage medium storing a policy list displaying program, for given subject sets for which inclusion relationships between subject sets can be specified, and policy sets in which subject sets to be applied are indicated, which causes a computer to perform:
- policy stratifying processing that, for two or more policies contained in said policy sets, generates a policy hierarchy map in which each of two or more policies are stratified within said policy hierarchy map, including a layer made of a policy to be applied to a subject set not in an inclusion relationship, based on inclusion relationships between subject sets to which each of said two or more policies are applied by assuming that each policy is a node;
- policy ordering processing that orders policy sets made of said two or more policies in a row by arranging each of said two or more policies in an order of deep layer to shallow or in an order of shallow layer to deep layer based on said policy hierarchy map generated in said policy stratifying processing; and
- list displaying processing that arranges elements in a policy set to be totally ordered according to a policy order decided as total order in said policy ordering processing and listing up said elements.

14. A non-transitory information storage medium storing an Access Control List (ACL) generating program, for given subject sets for which inclusion relationship between subject sets can be specified, and policy sets in which subject sets to be applied are indicated, which causes a computer to perform:
- policy stratifying processing that, for two or more policies contained in said policy sets, generates a policy hierarchy map in which each of two or more policies are stratified within said policy hierarchy map, including a layer made of a policy to be applied to a subject set not in an inclusion relationship, based on inclusion relationships between subject sets to which each of said two or more policies are applied by assuming that each policy is a node;
- policy ordering processing that orders policy sets made of said two or more policies in a row by arranging each of said two or more policies in an order of deep layer to shallow layer or in an order of shallow layer to deep layer based on said policy hierarchy map generated in said policy stratifying processing; and
- ACL generating processing that converts each policy description contained in a policy set to be totally ordered into an ACL description according to a policy order decided as total order in said policy ordering step.

* * * * *